United States Patent [19]
Masudaya

[11] Patent Number: 5,606,325
[45] Date of Patent: Feb. 25, 1997

[54] DETECTION OBJECT SEARCHING DEVICE

[75] Inventor: Hideki Masudaya, Miyagi-ken, Japan

[73] Assignee: Alps Electric Co., Ltd., Tokyo, Japan

[21] Appl. No.: 540,859

[22] Filed: Oct. 11, 1995

[30] Foreign Application Priority Data

Oct. 31, 1994 [JP] Japan .................................. 6-267515

[51] Int. Cl.$^6$ ....................................................... G01S 5/02
[52] U.S. Cl. ............................. 342/357; 342/42; 342/56; 342/457
[58] Field of Search ................................. 342/44, 46, 56, 342/417, 357, 457, 42

[56] References Cited

U.S. PATENT DOCUMENTS

| | | | |
|---|---|---|---|
| 3,914,762 | 10/1975 | Klensch | 343/6.5 SS |
| 4,015,259 | 3/1977 | Siverhus et al. | 343/6.8 LC |
| 4,177,466 | 12/1979 | Reagan | 343/112 TC |
| 4,680,587 | 7/1987 | Chisholm | 342/33 |
| 4,908,629 | 3/1990 | Apsell et al. | 342/457 |
| 5,132,687 | 7/1992 | Baldwin et al. | 342/44 |
| 5,355,137 | 10/1994 | Schurmann | 342/42 |

Primary Examiner—Thomas H. Tarcza
Assistant Examiner—Dao L. Phan
Attorney, Agent, or Firm—Guy W. Shoup; Patrick T. Bever

[57] ABSTRACT

The invention provides a detection object searching device which makes it possible to immediately know the direction of a mobile detection object such as a car by information presented on a display of a portable unit. The detection object searching device includes a portable operation unit and a body unit. The operation unit includes a transmission section for transmitting a search signal upon operation of a transmission button, a receiving section for receiving a direction indication information signal, an absolute direction detecting section for generating an absolute direction signal, a control section for generating direction indication information indicating the direction of the car based on the direction information signal and absolute direction signal, and a display section for displaying the direction indication information. The body unit includes a direction detection receiving section which searches the incoming direction of the search signal and generates an incoming direction signal, an absolute direction detecting section for generating an absolute direction signal, a control section for generating a direction information signal indicating the direction of the car with respect to the operation unit 1 from the incoming direction signal and absolute direction signal, and transmission section for transmitting a direction information signal.

6 Claims, 3 Drawing Sheets

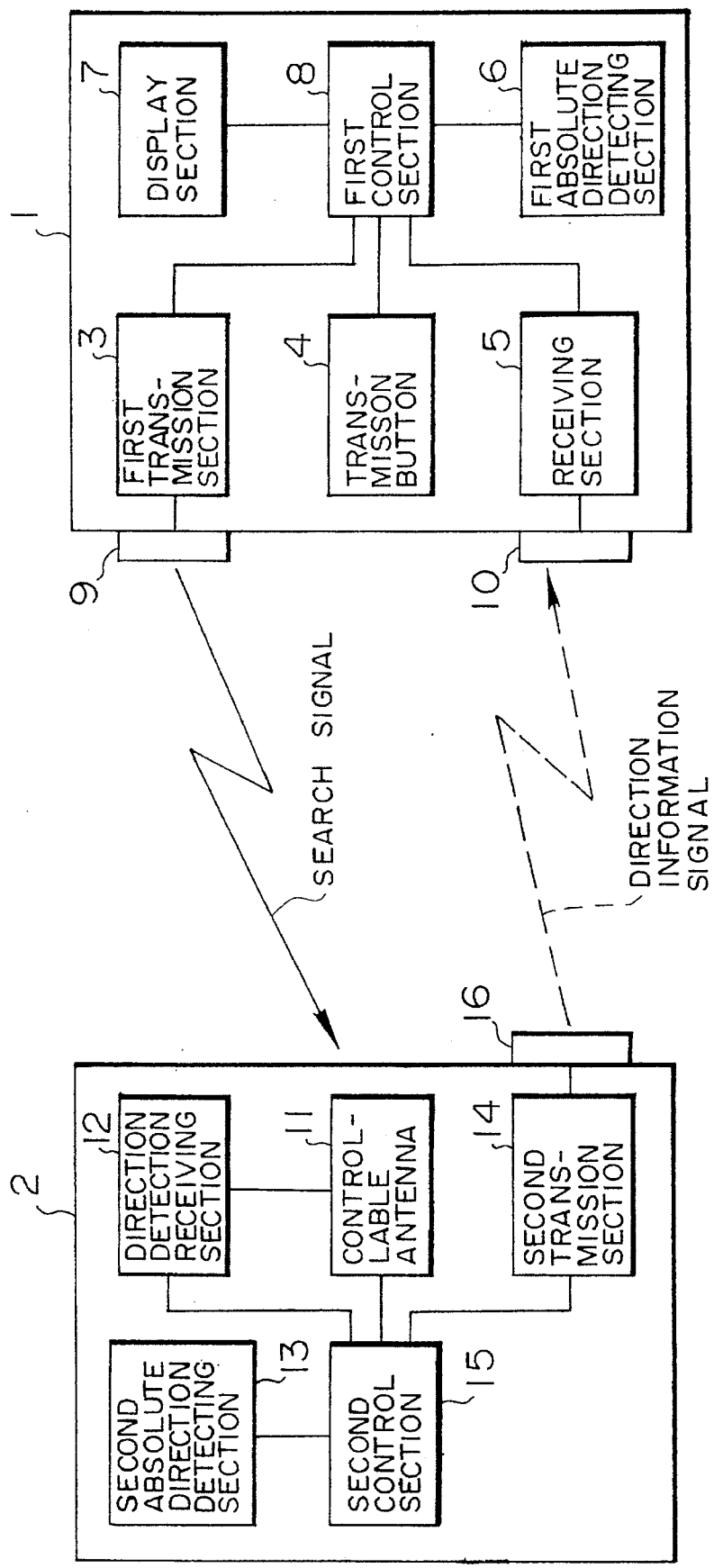

TO DIRECTION DETECTION
RECEIVING SECTION 12

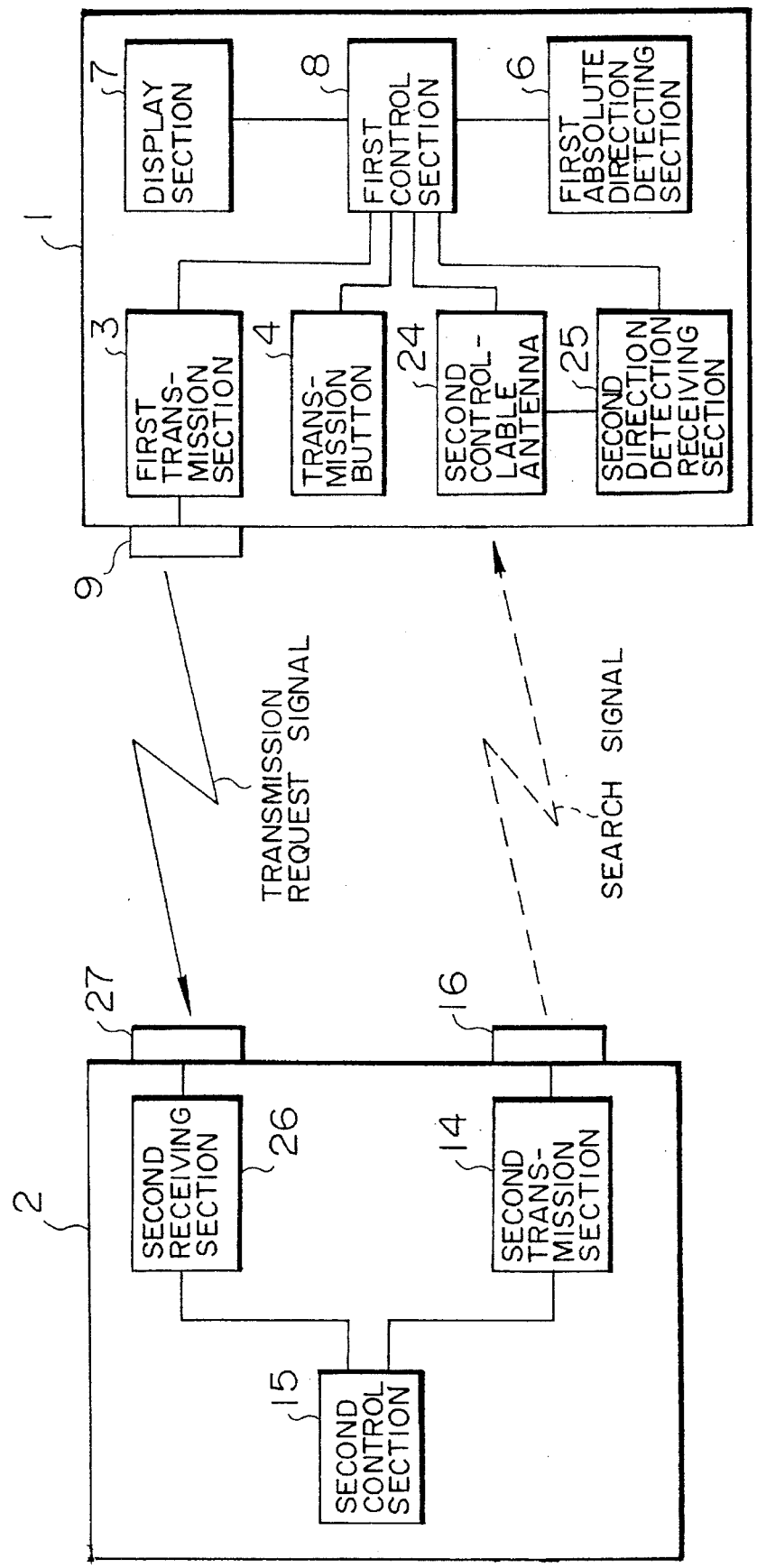

DETECTION OBJECT SEARCHING DEVICE

BACKGROUND OF THE INVENTION

1. Field of the Invention

The present invention relates to a detection object searching device, and, more particularly, to a detection object searching device which searches the present location of a mobile object such as a car by signal exchange between a portable operation unit and the mobile object and indicates the direction of the present location thereof on the portable operation unit.

2. Description of the Related Art

In general, a person, who has parked his car at an unfamiliar place, may leave it for a long time or go far away from the parked car. In such cases, he may forget where he parked his car or have a hard time finding his car, when getting back to his car.

This frequently occurs, for example, when parking in an unfamiliar and relatively large parking area such as a parking area divided into a number of parking sections specially provided when a sample fair, exhibition, or festival is being held, a high-story parking garage capable of accommodating a large number of cars in each floor where the driver moves his car in and out of the parking space, etc. This also occurs when parking on a maze-like road where there is no nearby indication which may serve as a guide to locate the parked car.

It is obvious that a person must walk around to find his parked car when he forgets where he parked his car. It only takes a certain amount of time to find the parked car when the finding range is definite even if this range is relatively large. However, it takes a considerable amount of time to find the parked car when the finding range is not definite such as when a person forgets which parking section of the parking area he parked the car or when he forgets which floor of the parking garage he parked his car.

In addition, it is dangerous to walk around in the parking area to find the parked car because he may get in the way of a driver trying to move his car in or out of the parking space.

SUMMARY OF THE INVENTION

In view of the above-described problems, an object of the present invention is to provide a detection object searching device which makes it possible to immediately know the direction of a mobile detection object by information on a display in an operation unit.

To these ends, there is provided according to a first aspect of the present invention a detection object searching device including a portable operation unit and a body unit, installed in a detection object, wherein the operation unit and the body unit have the following construction. The operation unit includes a first transmission section for transmitting a search signal upon operation of a transmission button; a receiving section for receiving a direction indication information signal transmitted from the body unit; a first absolute direction detecting section for generating a first absolute direction signal indicating an absolute direction; a first control section for generating direction indication information indicating the direction of the current location of the detection object, based on the direction information signal and the first absolute direction signal; and a display section for displaying the direction indication information. The body unit includes a direction detection receiving section which searches the incoming direction of the received search signal and generates an incoming direction signal; a second absolute direction detecting section for generating a second absolute direction signal that indicates an absolute direction; a second control section which generates the direction information signal indicating the direction of the detection object with respect to the operation unit, based on the incoming direction signal and the second absolute direction signal; and a second transmission section for transmitting the direction information signal.

To these ends, there is provided according to a second aspect of the present invention a detection object searching device including a portable operation unit and a body unit installed in a detection object, wherein the operation unit and the body unit have the following construction. The operation unit includes a first transmission section for transmitting a transmission request signal that requests transmission of a detection signal upon operation of a transmission button; a second direction detection receiving section which searches the incoming direction of the detection signal transmitted from the body unit and generates a second incoming direction signal; a first absolute direction detecting section for generating a first absolute direction signal indicating an absolute direction; a first control section for generating direction indication information indicating the direction of the detection object, based on the second incoming direction signal and the first absolute direction signal; and a display section for displaying the direction indication information. The body unit includes a second receiving section for receiving the transmission request signal; a second control section which responds to the transmission request signal and generates the detection signal; and a second transmission section for transmitting the detection signal.

According to the first aspect of the invention, when the operator such as a car owner, finding his parked car, presses the transmission button of the operation unit, a search signal is transmitted from the operation unit, and is received by the body unit installed in the detection object, for example, a car. Then, the body unit searches the direction of the incoming search signal and generates an incoming direction signal. In addition, based on this incoming direction signal and second absolute direction signal indicating an absolute direction such as directly north, a direction information signal indicating the current direction of the detection object such as a car is formed, followed by transmission of this direction information signal to the operation unit. Based on the received direction information signal and first absolute direction signal indicating an absolute direction such as directly north, the operation unit obtains direction indication information indicating the current direction of the detection object such as the direction of the location of the parked car, which is then displayed. The operator can immediately know the current direction of the detection object by observing the displayed direction indication information.

According to the second aspect of the present invention, when the operator such as a person finding the detection object presses the transmission button of the operation unit, a transmission request signal is transmitted from the operator unit and is received by the body unit installed in a detection object such as a car. The body unit responds to the transmission request signal to form a detection signal, which is then transmitted to the operation unit. The operation unit searches the direction of the incoming detection signal and generates an incoming direction signal. At this time, based on the incoming direction signal and first absolute direction signal indicating an absolute direction such as directly north, the body unit obtains direction indication information regarding the current direction of the detection object such as the direction of the parked car, which is then displayed. At this time, the operator can immediately know the current direction of the detection object such as the direction of his parked car by observing the displayed direction indication information.

BRIEF DESCRIPTION OF THE DRAWINGS

FIG. 1 is a block diagram illustrating an arrangement of a detection object searching device of a first embodiment of the present invention;

FIG. 3 is a block diagram illustrating an arrangement of a detection object searching device of a second embodiment of the present invention.

DESCRIPTION OF THE PREFERRED EMBODIMENTS

Figure 2A:
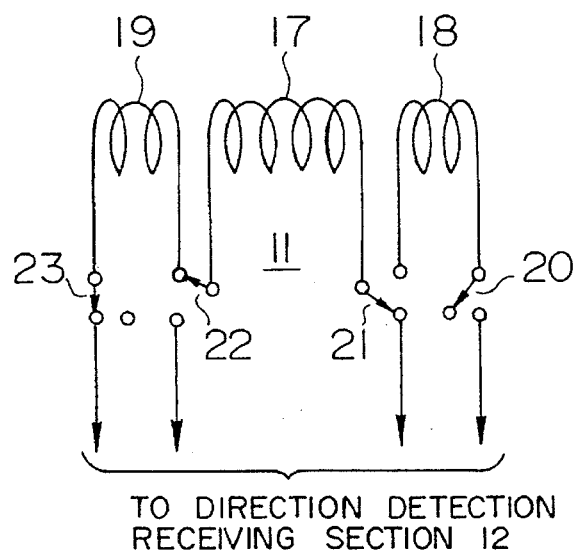
FIGS. 2A and 2B illustrate, respectively, a construction and directional characteristics of a controllable antenna of the body unit of the device of the first embodiment of the present invention of FIG. 1.

A description will now be given in detail of the preferred embodiments of the present invention with reference to the drawings.

FIG. 1 is a block diagram illustrating the detection object searching device of the first embodiment of the present invention, in which a car is taken as an example for the detection object.

Referring to FIG. 1, the detection object searching device is portable and generally includes a portable operation unit 1 and a body unit 2 installed in the detection object or car. The operation unit 1 includes a first transmission section 3, a transmission button 4, a receiving section 5, a first absolute direction detecting section 6, a display section 7, a first control section 8, operation unit antennas 9 and 10, while the body unit 2 includes a controllable antenna 11, a direction detection receiving section 12, a second absolute direction detecting section 13, a second transmission section 14, a second control section 15, and a body unit antenna 16. At the operation unit 1 side, the input of the first transmission section 3 is connected to the first control section 8, while the output of the section 3 is connected to the operation antenna 9. The output of the transmission button 4 is connected to the first control section 8. The input of the receiving section 5 is connected to the operation unit antenna 10, while the output of the section 5 is connected to the first control section 8. The output of the first absolute direction detecting section 6 is connected to the first control section 8. The input of the display section 7 is connected to the first control section 8. At the body unit 2 side, the input of the direction detection receiving section 12 is connected to the controllable antenna 11, while the output of the section 12 is connected to the second control section 15. The control side of the controllable antenna 11 is connected to the second control section 15. The output of the second absolute direction detecting section 13 is connected to the second control section 15. The input of the second transmission section 14 is connected to the second control section 15, while the output of the section 14 is connected to the body unit antenna 16. Here, for example, Global Pointing System (GPS) is used for the first absolute direction detecting section 6 and the second absolute direction detecting section 13.

The detection object (car) searching device having the aforementioned arrangement is used when a person forgets the location of the parked car. It is operated as follows.

When a car owner forgets the location of his parked car, the owner takes out the portable operation unit 1 and presses the transmission button 4. At this time, at the operation unit 1 side, when the transmission button 4 is pressed, an operation signal of the transmission button 4 is transmitted to the first control section 8. The first control section 8 responds to this operation signal and generates a search signal. This search signal is supplied to the first transmission section 3, and the signal's power level is increased to a required value, followed by transmission of the resultant signal from the operation unit antenna 9 to the space between the operation unit 1 and the body unit 2.

At the body unit 2 side, the search signal, which is transmitted from the operation unit 1, is received by the controllable antenna 11, and the received search signal is then supplied to the direction detection receiving section 12. Upon reception of the search signal, the second control section 15 controls the controllable antenna 11 so that its directivity is switched. Each time the directivity of the controllable antenna 11 is switched, the second control section 15 and the direction detection receiving section 12 cooperate with each other so as to allow detection of the strength of the received search signal and generation of an incoming direction signal which indicates the direction of transmission of the search signal. At this time, the second absolute direction detecting section 13 generates a second absolute direction signal indicating an absolute direction such as directly north, which is supplied to the second control section 15. Based on the input second absolute direction signal and the already obtained incoming direction signal, the second control section 15 generates a direction information signal indicating the direction of the present location of the parked car (detection object). The direction information signal is supplied to the second transmission section 14, and the signal's power level is increased to a required value, followed by transmission of the resultant signal out from the body unit antenna 16 to the space between the operation unit 1 and the body unit 2.

At the operation unit 1 side, the direction information signal transmitted from the body unit 2 is received by the operation unit antenna 10 and then supplied to the first control section 8 via the receiving section 5. When this occurs, the first absolute direction detecting section 6 generates a first absolute direction signal indicating an absolute direction such as directly north, which is supplied to the first control section 8. Based on the input first absolute direction signal and the direction information signal, the first control section 8 generates a direction indication information indicating the direction of the present location of the parked car (detection object) as viewed from the operator of the operation unit 1, that is the location of the car owner. This information is then supplied to the display section 7. The display section 7 displays supplied direction indication information, or, more specifically, information regarding, for example, the direction of the present location of the parked car (detection object) and the approximate distance between the car owner and the parked car.

In this case, the car owner can immediately know in what direction and at what distance the car exists with reference to his present location by the information displayed on the display section 7 of the portable operation unit 1. Therefore, the car owner no longer needs to walk around to find his parked car.

In the first embodiment, it is obvious that the search signal transmitted from the operation unit 1 and the direction information signal transmitted from the body unit 2 may be radio waves, light waves, or ultrasonic waves.

Figure 2B:
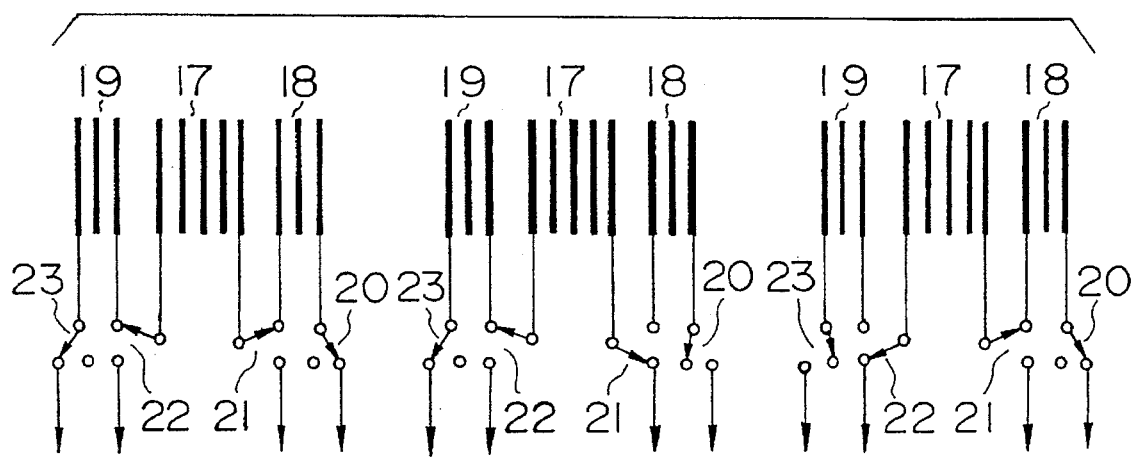

FIG. 2A illustrates a construction of the controllable antenna 11 of the body unit 2 of FIG. 1, while FIG. 2B illustrates directional characteristics thereof.

Referring to FIG. 2A, the controllable antenna 11 is composed of a detection coil 17, a first reflection/detection switching coil 18, provided at one side of the detection coil 17, a second reflection/detection switching coil 19, provided at the other side of the detection coil 17, and 1-circuit, 2-contact first to fourth change-over switches 20 to 23, provided at the ends of the detection coil 17 and the ends of the first and second reflection/detection switching coils 18 and 19, which are switched by the second control section 15. Here, the detection coil 17 and the first and second reflection/detection switching coils 18 and 19, provided at both sides of the coil 17, are wound such that their windings are of the same polarity and are disposed such that their axial centers are aligned. The moving contact of the first change-over switch 20 is connected to one end of the first reflection/detection switching coil 18. One of the fixed contacts of the switch 20 is open, while the other is connected to the direction detection receiving section 12. The moving contact of the second change-over switch 21 is connected to one end of the detection coil 17. One of the fixed contacts of the second change-over switch 21 is connected to the other end (the end to which the moving contact of the switch 20 is not connected) of the first reflection/detection switching coil 18, while the other is connected to the direction detection receiving section 12. The moving contact of the third change-over switch 22 is connected to the other end (the end to which the moving contact of the switch 21 is not connected) of the detection coil 17. One of the fixed contacts of the third change-over switch 22 is connected to one end of the second reflection/detection switching coil 19, while the other is connected to the direction detection receiving section 12. The moving contact of the fourth change-over switch 23 is connected to the other end (the end to which the fixed contact of the switch 22 is not connected) of the second reflection/detection switching coil 19. One of the fixed contacts of the fourth change-over switch 23 is open, while the other is connected to the direction detection receiving section 12.

The controllable antenna 11 having the aforementioned construction operates as follows.

When the second control section 15 controls the switching and connection of the moving contacts of the first to fourth change-over switches 20 to 23 as illustrated by the top drawing of FIG. 2B, the detection coil 17 and the first and second reflection/detection switching coils 18 and 19 are connected in a series arrangement, so that the first and second reflection/detection switching coils 18 and 19 function as detection coils just as the detection coil 17. In this arrangement, the detection coil 17 and the first and second reflection/detection switching coils 18 and 19 function in an integral manner. The integrally functioning detection coils provide a directivity pattern, as illustrated by the top drawing of FIG. 2B, which features a section whose sides diverge out at a certain angle in one directional range and another section whose sides diverge out in another directional range at a certain angle.

When the second control section 15 controls the switching and connection of the moving contacts of the first to fourth change-over switches 20 to 23 as illustrated by the middle drawing of FIG. 2B, the detection coil 17 and the second reflection/detection switching coil 19 are connected in a series arrangement so that the second reflection/detection switching coil 19 functions as a detection coil just as the detection coil 17. On the other hand, the first reflection/detection coil 18 is in an open state, so that it functions as a reflection coil with respect to the detection coil 17. In such an arrangement, the detection coil 17 and the second reflection/detection switching coil 19 function integrally, and the reflection coil is disposed at one side of the detection coil. The aforementioned detection coils and reflection coil provide a directivity pattern which features only the aforementioned one section whose sides diverge out at a certain angle in one directional range, as illustrated by the middle drawing of FIG. 2B.

When the second control section 15 controls the switching and connection of the moving contacts of the first to fourth change-over switches 20 to 23 as illustrated by the bottom drawing of FIG. 2B, the detection coil 17 and the first reflection/detection switching coil 18 are this time connected in a series arrangement so that the first reflection/detecting switching coil 18 functions as a detection coil just as the detection coil 17. The second reflection/detection coil 19 is in an open state so that it functions as a reflection coil with respect to the detection coil 17. In this arrangement, the detection coil 17 and the first reflection/detection switching coil 19 function integrally, with the reflection coil disposed at one side of the detection coil. The aforementioned detection coils and reflection coil provide a directivity pattern which features only the aforementioned another section whose sides diverge out at a certain angle in another directional range, as illustrated by the bottom drawing of FIG. 2B.

Accordingly, in the controllable antenna 11 of the embodiment, when switching and connection of the moving contacts of the first to fourth change-over switches 20 to 23 are controlled by the second control section 15, the directivity of the controllable antenna 11 changes considerably every time switching is performed, so that this change in directivity can be used to easily detect the direction of the incoming search radio signal transmitted from the operation unit 1. In addition, a two-stage construction of the controllable antenna 11 of the embodiment allows easy and accurate detection of the direction of the incoming search radio signal to be achieved.

FIG. 3 is a block diagram of an arrangement of the detection object searching device of the second embodiment of the present invention, in which a car is also taken as an example for the detection object.

In the second embodiment illustrated in FIG. 3, a receiving antenna, provided in the operation unit 1, is given directivity, so that the construction of the body unit 2 can be simplified. The construction of the operation unit 1 of the device of the second embodiment differs from that of the first embodiment as follows. Whereas the operation unit 1 of the first embodiment includes the receiving section 5 and the operation unit antenna 10, the operation unit 1 of the second embodiment includes a second controllable antenna 24 and a second direction detection receiving section 25. In the first embodiment, a search signal is transmitted from the first transmission section 3, while in the second embodiment, a transmission request signal that requests transmission of a direction information signal is transmitted. On the other hand, the construction of the body unit 2 of the second embodiment differs from that of the first embodiment as follows. Whereas the body unit 2 of the first embodiment includes controllable antenna 11 and direction detection receiving section 12, the body unit 2 of the second embodiment includes a second receiving section 26 and a body unit antenna 27. In addition, the body unit 2 of the first embodiment includes second absolute direction detecting section 13, while that of the second embodiment does not include absolute direction detecting section 13. Besides these differences, the arrangement of the second embodiment does not differ from that of the first, so that further description of the arrangement of the second embodiment will be omitted.

A description will be given of the operation of the device of the second embodiment having the above-described arrangement.

When a car owner, who is finding his parked car, presses a transmission button 4 of the operation unit 1, an operation signal is transmitted from a first control section 8. The first control section 8 responds to this operation signal and generates a transmission request signal for transmission of a detection signal from the body unit. The power level of the transmission request signal is increased to a required value at the first transmission section 3, followed by transmission of the resultant signal from an operation unit antenna 9 to the space between the operation unit and the body unit.

In the body unit 2, the transmission request signal, transmitted from the operation unit 1, is received by the body unit antenna 27, after which the received signal is supplied to a second control section 15 via the second receiving section 26. The second control section 15 responds to the transmitted transmission request signal and generates a detection signal. The detection signal is supplied to a second transmission section 14, and the signal's power level is increased to a required value, followed by transmission of the resultant signal from the body unit antenna 16 to the space between the operation unit and the body unit.

The detection signal, which is transmitted from the body unit 2, is received by the second controllable antenna 24 of the operation unit 1. When this occurs, the first control section 8 controls the second controllable antenna 24 so that its directivity is switched. Each time the directivity of the controllable antenna 24 is switched, the first control section 8 and the second direction detection receiving section 25 cooperate with each other so as to allow detection of the strength of the supplied reception detection signal and generation of a second incoming direction signal that indicates the direction of transmission of the detection signal. Here, a first absolute direction detecting section 6 generates a first absolute direction signal that indicates an absolute direction such as directly north, and the generated signal is supplied to the first control section 8. Based on the input first absolute direction signal and the second incoming direction signal, the first control section 8 generates direction indication information indicating the direction of the current position of the parked car (detection object), as viewed from the operator of the operation unit 1 or the car owner. This generated information is supplied to a display section 7. The display section 7 displays the supplied direction indication information, that is, information regarding the direction of the current position of the parked car (detection object) and the approximate distance from the car owner to the parked car. In the second embodiment, if the information displayed on the display section 7 is inaccurate or has no meaning, the owner can operate the operation unit 1 and change the orientation of the controllable antenna 24 so that it is moved nearer the direction of transmission of the detection signal, thereby making it possible to display accurate information on the display section 7.

In this case, the car owner can immediately know the direction of the parked car with reference to his present location and the distance between his present location and the parked car by the information displayed on the display section 7 of the portable operation unit 1. Therefore, the car owner no longer needs to walk around to find the parked car.

In the second embodiment as in the first embodiment, it is obvious that the search signal transmitted from the operation unit 1 and the direction information signal transmitted from the body unit 2 may be radio waves, light waves, or ultrasonic waves.

The invention is applicable to various types of mobile detection objects, although a car has been specifically mentioned as the detection object in the first and second embodiments.

As will be understood from the foregoing description, according to a first to third forms of the first aspect of the present invention, the portable operation unit 1 transmits a search signal, and the body unit 2 responds to this search signal to transmit a direction information signal, followed by reception of this direction information signal by the operation unit 1, so as to allow display of direction indication information indicating the current direction of the detection object such as the direction of a parked car. Therefore, the operator of the portable operation unit 1 can immediately know, for example, the direction of the parked car by the displayed direction indication information. In addition, the direction indication information can be displayed regardless of the orientation of the portable operation unit 1.

According to a first to third forms of the second aspect of the present invention, the portable operation unit 1 transmits a transmission request signal and the body unit 2 responds to this transmission request signal to transmit a detection signal, after which based on the received detection signal incoming direction and absolute direction the operation unit 1 displays direction indication information indicating, for example, the direction of the parked car. Therefore, the operator of the portable operation unit can get the desired information by properly changing the direction of the portable operation unit while looking at the direction indication information being displayed and immediately know, for example, the direction of the parked car. In addition, the arrangement of the body unit 2 is simple compared to the arrangement described in the first to third forms of the first aspect of the invention.

What is claimed is:

1. A detection object searching device including a portable operation unit and a body unit installed in a detection object, wherein said operation unit includes:

a first transmission section for transmitting a search signal upon operation of a transmission button;

a receiving section for receiving a direction information signal transmitted from said body unit;

a first absolute direction detecting section for generating a first absolute direction signal indicating an absolute direction;

a first control section for generating direction indication information indicating the direction of the current location of said detection object, based on said direction information signal and said first absolute direction signal; and a display section for displaying the direction indication information;

and wherein said body unit includes:

a direction detection receiving section which searches the incoming direction of the received search signal and generates an incoming direction signal;

a second absolute direction detecting section for generating a second absolute direction signal that indicates an absolute direction;

a second control section which generates said direction information signal indicating the direction of said detection object with respect to said operation unit, based on said incoming direction signal and said second absolute direction signal; and a second transmission section for transmitting said direction information signal.

2. A detection object searching device according to claim 1, wherein Global Pointing System (GPS) is used for said first absolute detection section in said operation unit and for said second absolute direction detection section in said body unit.

3. A detection object searching device according to claim 1, wherein said direction detection receiving section is composed of a coiled antenna and two coiled auxiliary elements provided on both sides thereof, said two auxiliary elements provided with a controllable antenna which is selectively connected to said coiled antenna by control of said second control section.

4. A detection object searching device including a portable operation unit and a body unit installed in a detection object, wherein said operation unit includes:

a first transmission section for transmitting a transmission request signal that requests transmission of a detection signal upon operation of a transmission button;

a second direction detection receiving section which searches the incoming direction of said detection signal transmitted from said body unit and generates a second incoming direction signal;

a first absolute direction detecting section for generating a first absolute direction signal indicating an absolute direction;

a first control section for generating direction indication information indicating the direction of said detection object, based on said second incoming direction signal and said first absolute direction signal; and a display section for displaying the direction indication information;

and wherein said body unit includes:

a second receiving section for receiving said transmission request signal;

a second control section which responds to said transmission request signal and generates said detection signal; and a second transmission section for transmitting said detection signal.

5. A detection object searching device according to claim 4, wherein Global Pointing System (GPS) is used for said first absolute direction detection section in said operation unit.

6. A detection object searching device according to claim 4, wherein said second direction detection receiving section is composed of a coiled antenna and two coiled auxiliary elements provided at both sides thereof, said two auxiliary elements provided with a second controllable antenna selectively connected to said coiled antenna by control of said first control section.

\* \* \* \* \*